April 22, 1969 P. H. HAMISCH, SR 3,440,123
HAND LABELER
Filed Jan. 10, 1966 Sheet 3 of 6
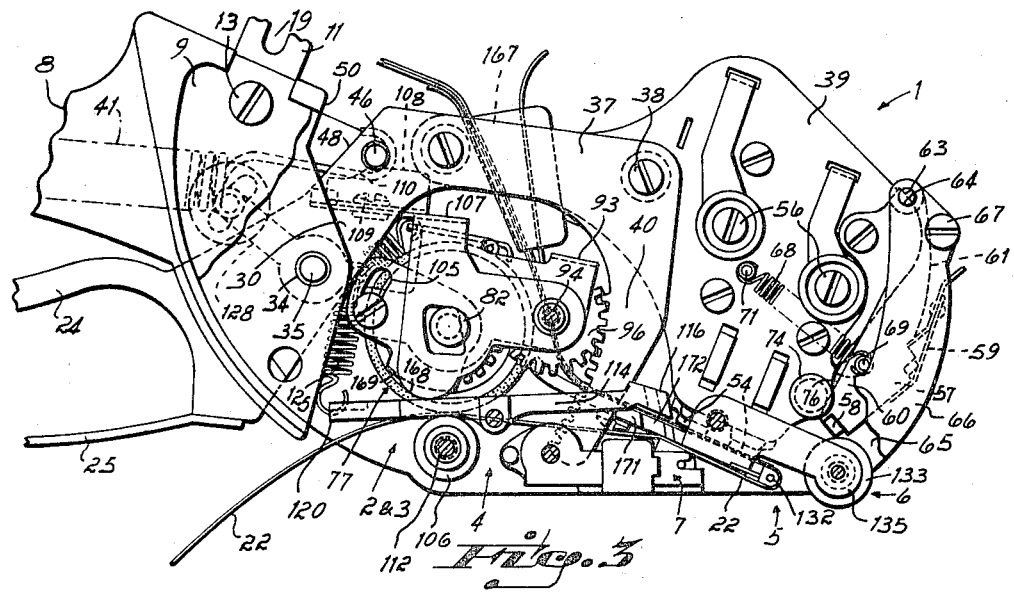
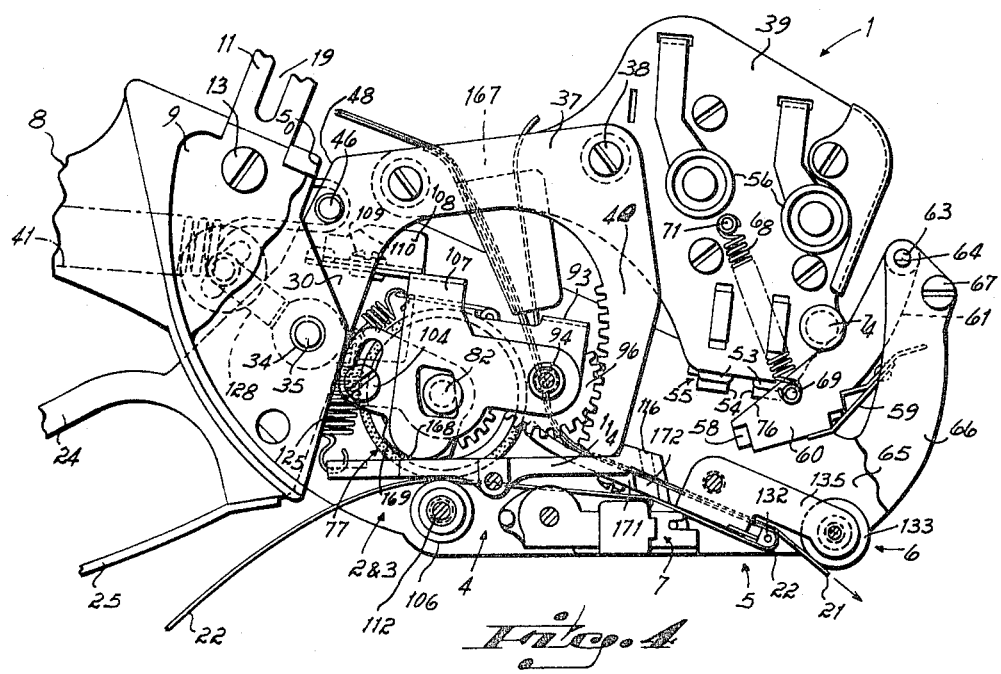
INVENTOR.
Paul H. Hamisch
BY
Wood, Herron & Evans
ATTORNEYS

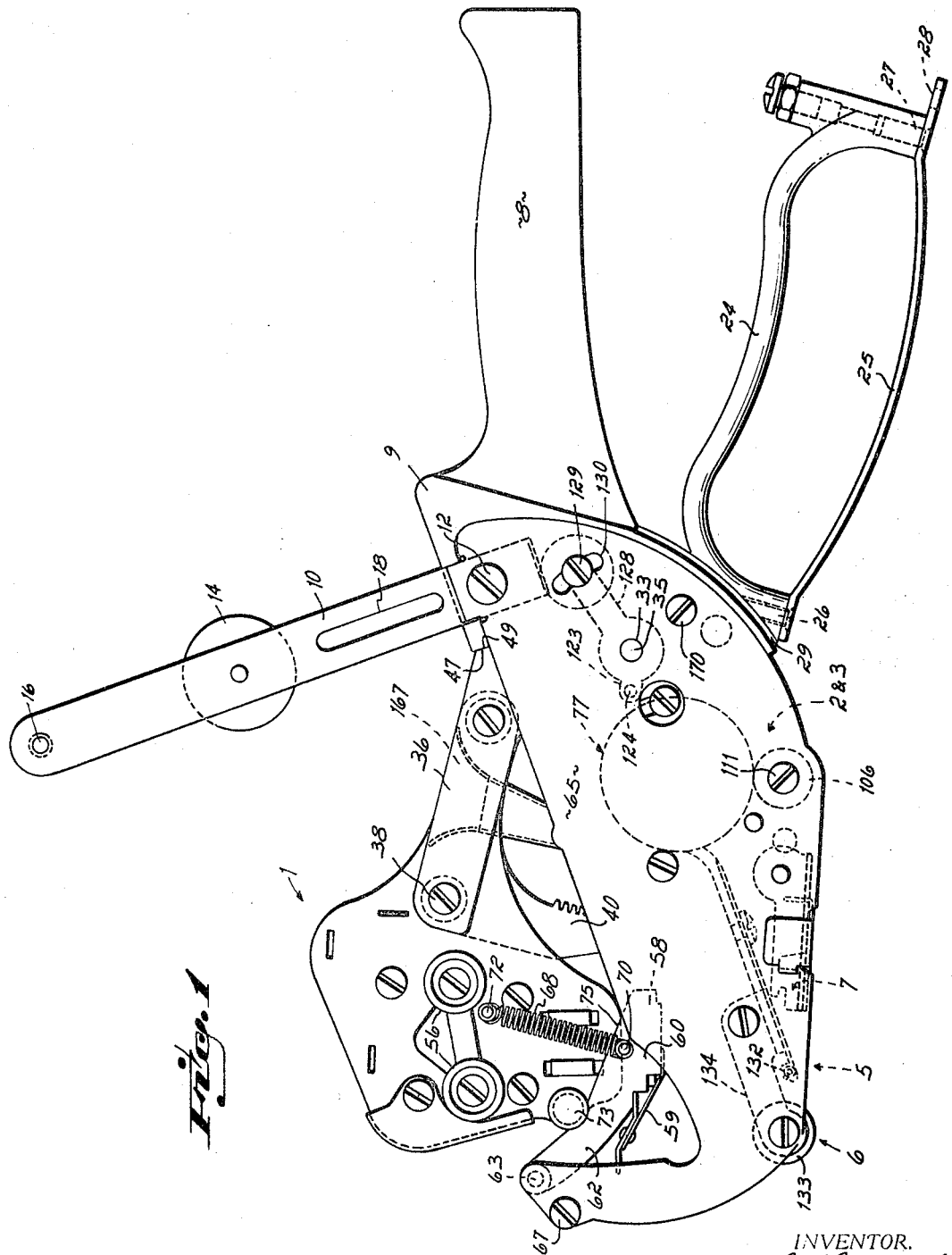

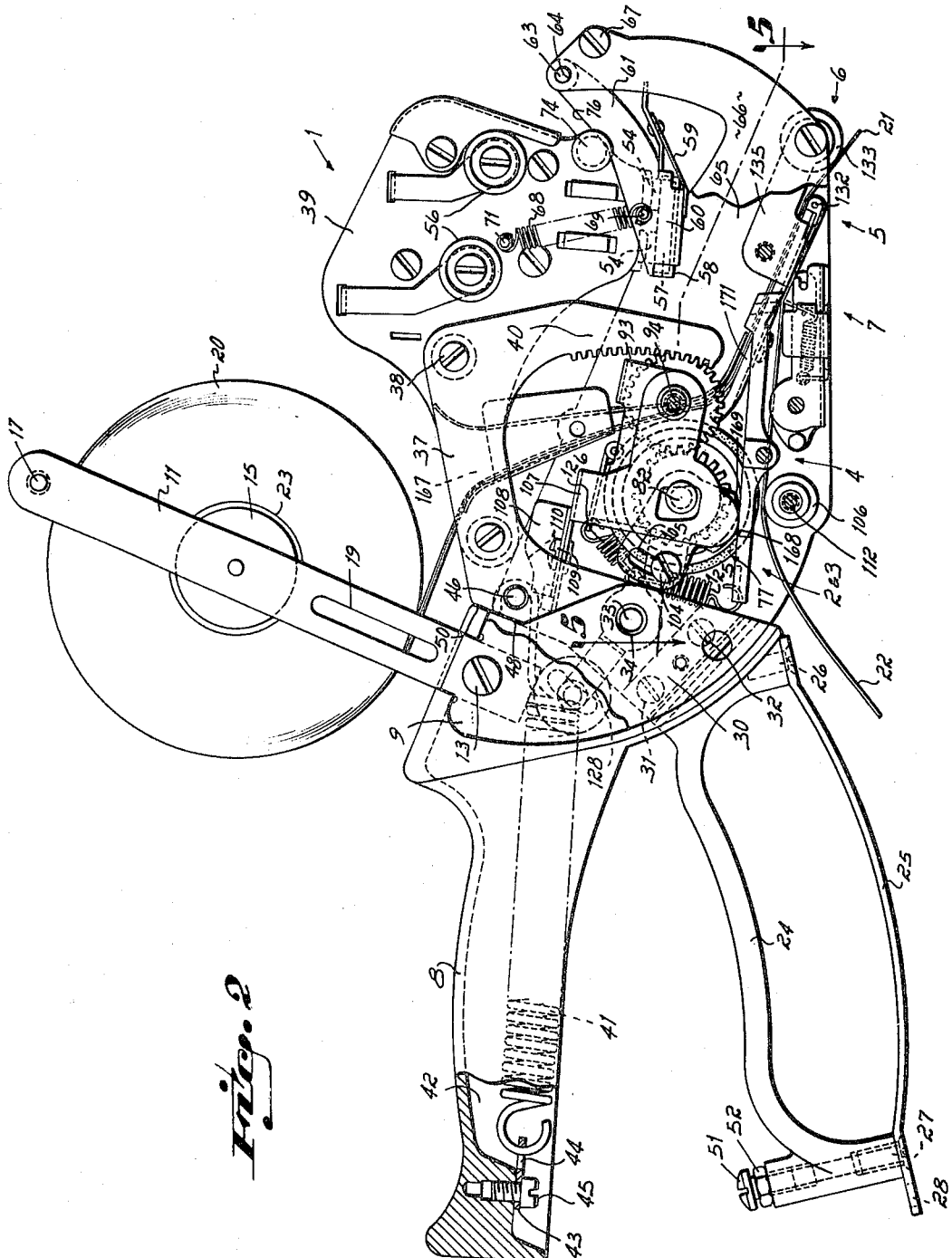

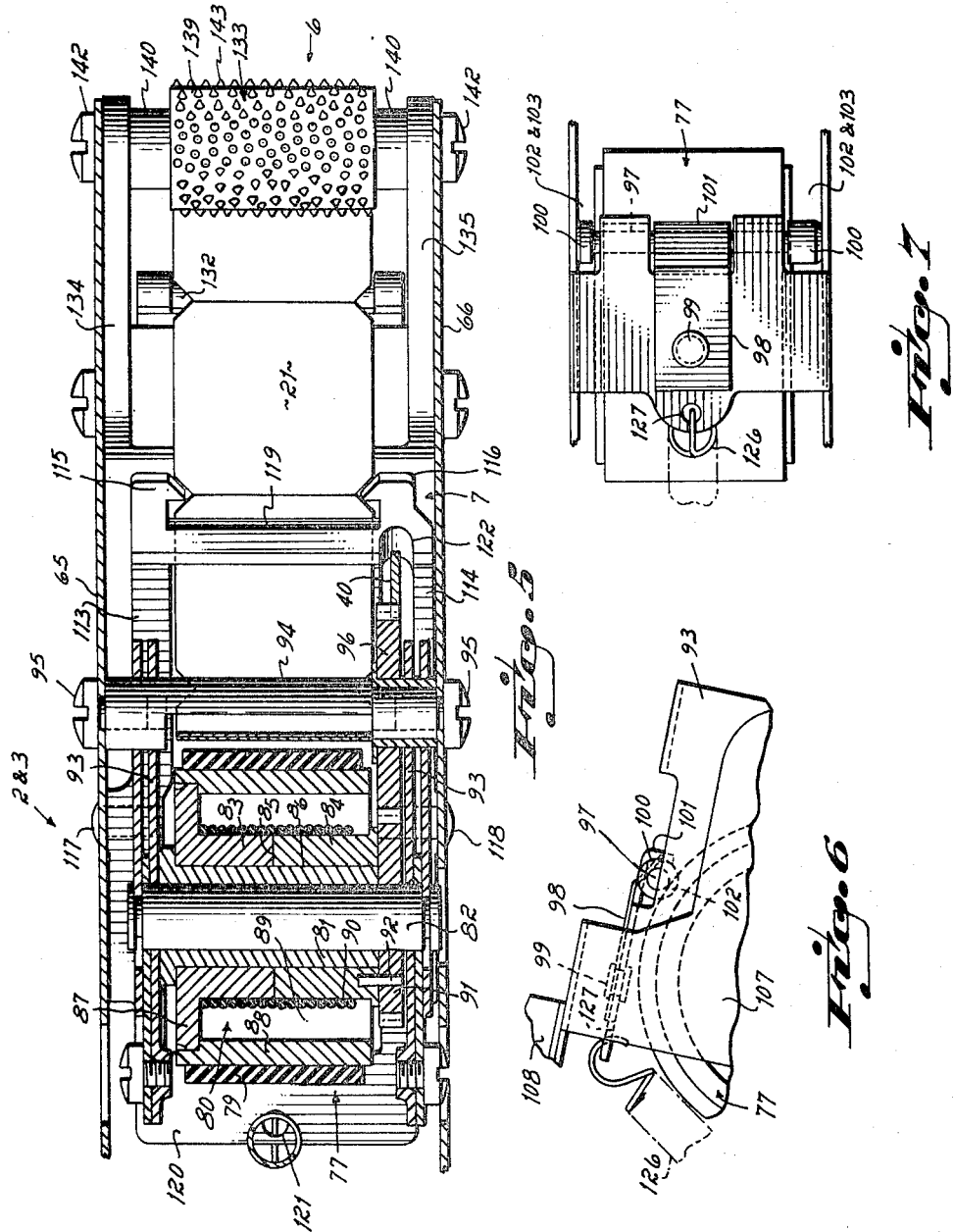

April 22, 1969   P. H. HAMISCH, SR   3,440,123
HAND LABELER
Filed Jan. 10, 1966   Sheet 5 of 6
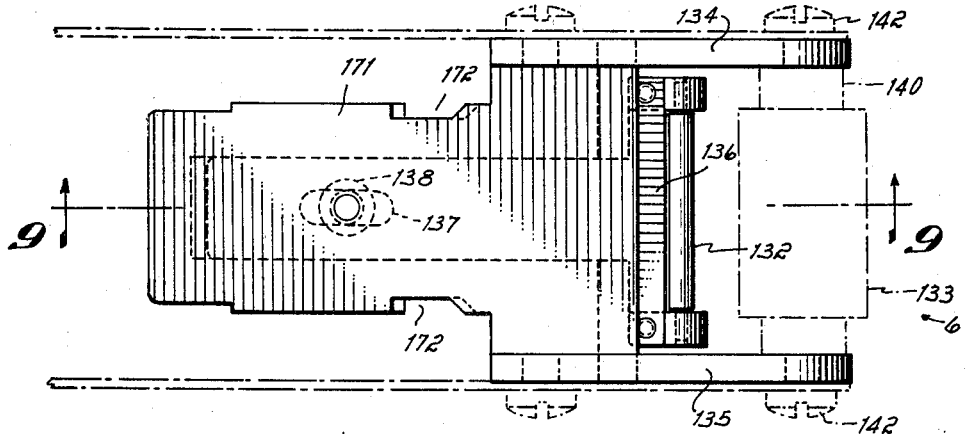
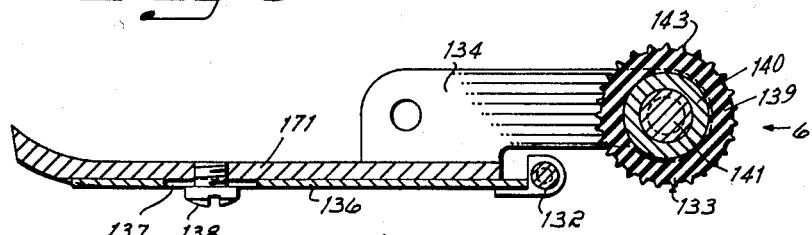
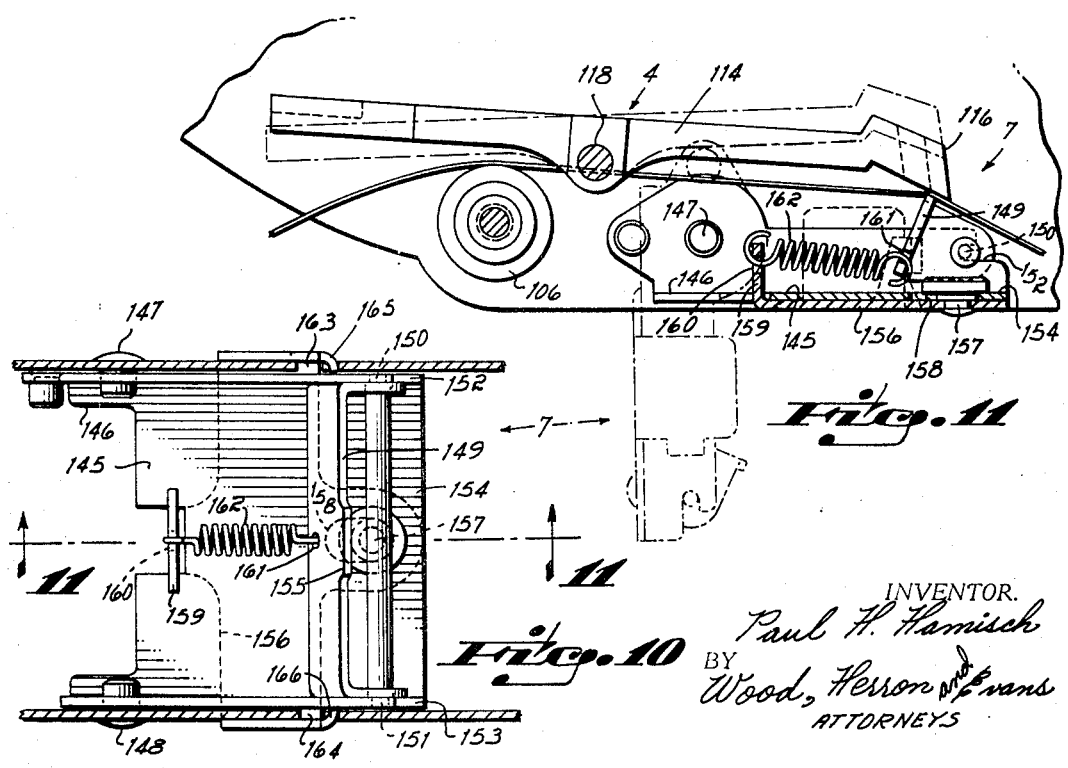
INVENTOR.
Paul H. Hamisch
BY Wood, Herron and Evans
ATTORNEYS

United States Patent Office 3,440,123
Patented Apr. 22, 1969

3,440,123
HAND LABELER
Paul H. Hamisch, Sr., Dayton, Ohio, assignor to The Monarch Marking System Company, Dayton, Ohio, a corporation of Ohio
Filed Jan. 10, 1966, Ser. No. 534,261
Int. Cl. B65c 11/02
U.S. Cl. 156—384    23 Claims This invention relates to labeling devices and, more particularly, relates to a labeling device which may be operated in one hand whereby a label from a continuous label strip may be printed, dispensed, and applied in a simple, quick, operational cycle.

The ink pad and hand stamp are still commonly used for marking certain types of goods. However, the label, with an adhesive backing for adherence thereof to goods, has largely supplanted the ink pad and hand stamp in many merchandising fields. Actually, the label has become a modern necessity for the attractive marketing of goods in the advertisement conscious stores of today. In addition, not only may a greater amount of information regarding the merchandise be conveyed to the consumer through labels than through the ink pad and stamp, but inventory control information may be placed thereon, thus greatly increasing efficiency with the concomitant effect of reducing sales costs. However, accompanying the greatly increased use of labels have been problems associated with the printing, dispensing and applying of the labels to the desired merchandise in an economical and efficient manner.

Labels which are dispensed by prior art hand labeler devices are usually detached from a continuous backing strip having separate pressure sensitive labels attached thereto. This type label is generally manufactured by adhering a strip of label material, by means of a pressure sensitive adhesive, to a substrate of, for example, glassine paper. The strip of label material is then cut into individual labels while on the glassine backing strip without cutting the backing strip. Thus, a continuous label strip having separate labels thereon is provided.

In the prior art dispensing methods the labels or label strips are usually printed beforehand with the label dispensing devices employing, therefor, preprinted labels. In normal circumstances, such as when rolls of labels are used, this mode of operation does not allow the printed matter on the labels to be changed without changing and rethreading label rolls being used by the dispensing device. Thus, in many instances there is not only a loss of time in changing and rethreading the preprinted label rolls but there very well may be an accompanying loss of labels, not only due to rethreading but including losses due to obsolescence of the preprinted subject matter.

The drive mechanisms of the prior art hand label dispensing devices have also given rise to problems in the past. For example, the basic drive mechanisms may include a drive or friction wheel and an idler wheel which cooperatively grip the label backing strip, i.e., the strip to which the adhesive side of the label adheres prior to being adhered to goods, or the label-backing strip combination, i.e., the label strip, and unwind it from the label supply roll for subsequent application of the labels to merchandise as desired. However, such a mechanism is subject to performance variations due to slippage between the drive and idler wheels and may result in the labels not being dispensed the desired distance from the device such that they may be easily and efficiently applied.

The prior art hand labelers also lack flexibility of operation in that they are generally not capable of handling a wide range of label lengths. Even those label dispensing devices that can handle more than one label size most generally have adjustments that do not lend themselves to simplicity of operation and provide additional troublesome maintenance areas during every day operation of the labeler. Thus, prior art hand labelers are not capable of automatically adjusting from one label length to another.

The label dispensing device of this invention obviates the aforementioned problems by providing an improved hand labeler which generally comprises a print mechanism, a drive mechanism and a dispenser-applicator mechanism all in one integrated piece of apparatus, the apparatus being of such size that it may be held and operated in one hand.

The printing mechanism of the hand labeler includes a printing head which is formed from one or a series of bands having characters thereon, each band being mounted such that it may be rotated to select the desired character to be placed in the print position. Of course, the characters on the band may include letters, numerals, signs, designs or any combination thereof. Each series of bands prints a line of characters, the length of the line being dependent upon the number of bands in the series as each band generally is only one character in width, though it may be wider if so desired. The particular character to be printed from any given band may be chosen by rotating the band and, hence, the characters on the band, until the desired character is in the print position. Rotation of the bands is accomplished by a hand actuated mechanism by means of which the band to be rotated is first selected and subsequently rotated to the desired position. The printing head itself, as previously described forms no part of the inventive concepts embodied in this application. A printing platen is also provided to cooperate with the printing head for purposes of having a solid surface against which the printing head may press in order that it may operate effectively.

The printing mechanism also includes means by which the series of bands of the printing head may be alternately brought into engagement with the label from an initial position to effect the printing thereof and returned to the initial position some distance from the label to permit movement of the labels through the labeling device. The mechanism by which the printing head is moved into and out of contact with the label includes a pair of handles by means of which the device is held and operated, one of which pivots with respect to the other, with the printing head being secured to an extension of the pivotable handle.

The drive system of the hand labeler includes drive means which unwind the label strip from the label supply roll, progressively move the label strip into alignment with the printing head, provide the force which enables the printed label to be removed from the backing strip and dispensed from the labeler, and align the printed label with the applicator. Also provided within the drive mechanism are limit means which allow the label strip to be moved only a given distance during each operational cycle, the distance being dependent on the length of the labels. The drive means includes a one-way clutch for the friction or drive wheel, an idler wheel and a rack and gear system for driving the friction wheel. The rack and gear system is connected to the drive wheel such that upon squeezing the pivoted handle towards the fixed handle the rack moves into the drive position. The drive wheel is also brought into contact with a portion of the label strip and the idler wheel at this time. Because of the one-way clutch the frictional wheel does not turn during this step. Upon release of the handle the one-way clutch takes hold, the rack and gear system is actuated, and the drive wheel, being in operational contact with a portion of the label strip and the idler wheel, thus moves the label strip through the device.

The limit means, which ensures alignment of the label being printed with the printing head and ensures that only one label at a time is dispensed from the device, in addition to providing flexibility for handling different size labels, cooperates with the drive means. Basically, the limit means include a pivotable limit arm which has fingers at the one end of the arm that ride on the label strip as it is being moved through the device. The arm is biased such that the tendency of the fingers is to drop through notches provided in the label strip and this occurs when the fingers contact the notches. As the fingers drop through the notches, the other end of the arm, which has surfaces that provide a camming action, cams the drive wheel out of operable contact with the label strip and idler wheel, thus stopping the movement of the labels through the device.

The dispenser-applicator mechanism includes stripping means which are adjustably positioned with reference to pressing means, the distance there between being dependent on the length of labels being used. After being printed, the label-backing strip combination passes through the stripping means whereat the label is caused to separate from the backing strip and be projected beyond the stripping means to an extent where its leading edge is in contact with the pressing means and its trailing edge remains adhered to the backing strip. The label is subsequently placed in contact with the merchandise to which it is to be adhered and the pressing means activated such that the label is totally removed from the backing strip and adequate adhesion of the label to the merchandise is insured.

Accordingly, it has been the primary objective of this invention to provide a label dispensing device that may execute the functions of printing, dispensing and applying a label in a single operational cycle while being operated by only one hand of an operator, thus leaving the other hand free to handle the goods being labeled if it is so desired.

It has been a further objective of this invention to provide a hand labeler wherein the label is printed immediately prior to being dispensed from the labeler and applied to the goods.

It has been another objective of this invention to provide a hand operable label dispensing device that will dispense labels of varying length, the different length labels being supplied, as desired, from the same label supply roll wherein the label length may be in any desired sequence or from different label supply rolls wherein each roll has labels of a substantially constant length.

It has been a further objective of this invention to provide a hand labeler which automatically dispenses labels of varying length without substantial adjustments to the labeler by the operator being required such that maximum simplicity of operation is achieved.

It has been yet another objective of this invention to provide a drive mechanism for the hand labeler which prevents slippage between the label strip, drive wheel and idler wheel by creating greater intimate contact of the drive wheel and idler wheel with the label strip as the tendency for slippage, due to resistance of the label strip to movement, increases.

It has been still another objective of this invention to provide label strip lock means for the hand labeler which allows the label strip to effectively proceed in only one direction after it has been threaded into operational position within the dispenser-applicator mechanism and which prevents excessive slack from occurring within the stripping means whereat the label is separated from the backing strip.

It has been still a further objective of this invention to provide a centering system which cooperates with the drive mechanism of the hand labeling device whereby, during each cycle of operation, the correct and accurate positioning of the labels for printing will be consistently insured.

It has been another objective of this invention to provide a hand labeler wherein the printed subject matter on the labels being dispensed may be changed without having to substitute a new supply roll of labels or remove and rethread the labels, but may be changed quickly and efficiently without wasting labels or time The further objects and advantages of the present invention will be apparent from the following detailed description wherein the preferred embodiment of the invention is described with reference being made to the accompanying drawings.

In the drawings,

FIGURE 1 is a side elevational view of the hand operated, printing-dispensing-applying label device produced in accordance with the principles of this invention with all components being in an initial position;

FIGURE 2 is a view similar to FIGURE 1 having one side plate partially cut away to more clearly depict the mechanisms of the hand labeler, and depicting the upper handle in partial cross section;

FIGURE 3 is an enlarged view of the front portion of the hand labeler shown in FIGURE 2 with the printing head depicted in operational engagement with the printing platen for printing the labels;

FIGURE 4 is a view similar to FIGURE 3 with the printing head out of printing engagement with the label strip and the label strip moving through the device;

FIGURE 5 is an enlarged cross sectional view taken along line 5—5 of FIGURE 2;

FIGURE 6 is a side elevational view of the braking pin associated with the one-way clutch assembly of the drive wheel;

FIGURE 7 is a top elevational view of that portion of the drive mechanism depicted in FIGURE 6;

FIGURE 8 is a bottom elevational view of the stripping bar, pressure roller, and printing platen associated with the applicator mechanism;

FIGURE 9 is a cross sectional view taken along line 9—9 of FIGURE 8;

FIGURE 10 is a bottom elevational view of the locking mechanism, stripping bar and printing platen associated with the applicator mechanism;

FIGURE 11 is a cross sectional view taken along line 11—11 of FIGURE 10;

Figure 12:
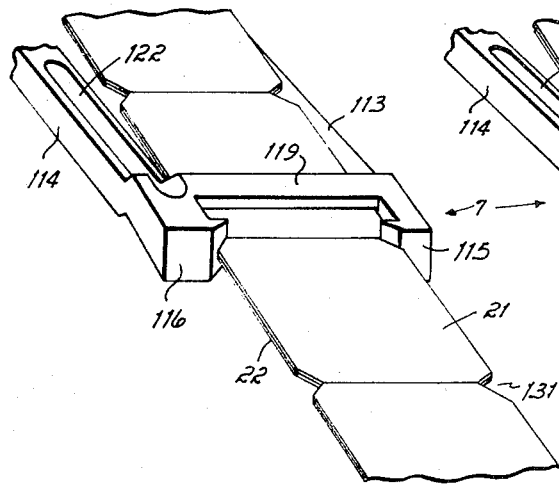
FIGURES 12, 13 and 14 depict the pivotal limit arms cooperating with the notched, label-backing strip combination, which is preferably employed as the label strip.

As previously mentioned, the labels preferably used with the hand labeling device of this invention are adhered to a glassine paper backing strip by means of a suitable adhesive. The glassine paper backing strip is continuous, however, the labels themselves are independently adhered to the backing strip. That is, the labels have already been separated one from the other and are maintained on the same backing strip adjacent to each other only because they are adhered to the backing strip. It will be noted, as can clearly be seen in FIGURES 12–15, that notches are provided in the label-backing strip combination on each side of the strip at the points where the labels are separated one from the other.

For purposes of the subsequent description of the preferred embodiment of this invention the phrase "label-backing strip combination" will be considered to be synonymous with the term "label strip." Although the differences in length (within practical limits), when considered in the direction of the passage of the labels through the machine, are relatively immaterial, the width of the labels on any given supply roll must remain substantially constant.

The preferred embodiment of the hand labeling device of this invention, as illustrated in FIGURES 1 and 2, generally comprises a print mechanism 1, a drive mechanism 2 having drive means 3 and limit means 4, and a dispenser-applicator mechanism 5 having pressure means 6, label strip locking means 7 and label separator means. The primary structure of the hand labeler includes an upper or immobile handle 8, which is integrally molded with a base structure 9 at one end thereof and shaped for ease of handling. Associated with the base structure 9, at the top and on each side thereof, are two spring steel arms 10, 11. The arms are held to the base structure 9 at one end by screws 12, 13. Each arm 10, 11 carries a button 14, 15 intermediate the ends thereof and rigidly secured thereto. At the furthermost tips or upper ends of the spring arms 10, 11 are two studs 16, 17, each of which is secured to an arm and positioned such that they contact one another for the purpose of maintaining a desired spread between the uppermost tips of the two arms. Adjacent the base structure 9 and cut in each of the two spring arms 10, 11 are elongated slots 18, 19 which are for the purpose of increasing the flexibility of the arms at their point of intersection with the base structure, thus allowing the arms to be easily spread apart. A roll 20 of pressure sensitive labels 21 attached to a glassine backing strip 22, as previously described, is placed between the spring arms 10, 11, the center hole 23 in the roll being of a diameter such that it fits over each of the buttons 14, 15 intermediate the ends of the spring arms. The sum of the lengths of the two studs 16, 17 is approximately equivalent to the width of the labels 21 on the roll 20 and consequently the spring arms 10, 11 help control the unspooling of the roll of labels such that very little slack is encountered upon unspooling because of the slight frictional contact of the spring arms against the sides of the label roll.

Rigidly held to the base structure 9 is a base frame having two side plate structural members 65, 66 which are provided for the purpose of maintaining structural rigidity in the various components of the device relative one to the other. The side plates 65, 66 are secured to the base structure 9 on opposite sides thereof by corresponding fasteners 12, 13 and 170 and are maintained in a fixed relationship at the ends furthermost from the base structure 9 at 67 by a dowel and fasteners.

Associated in a pivotal manner with the base structure 9 is a bottom or pivotable handle 24 shaped such that it is easy to grip for purposes of squeezing the bottom handle toward the upper handle 8. Closing the grip on the bottom handle 24 is a curved bar 25 which is attached by screws 26, 27 to the bottom handle structure. At the rearward end of the bar 25 is an aperture 28 for the purpose of hanging the hand labeler on a hook when not in use, if so desired. Secured to the bottom handle 24 is a pivoting frame having extension structural members 29, 30 which are attached to the handle on opposite sides thereof by a set of fasteners 31, 32, there being one set of fasteners for each extension member. Apertures 33, 34, in identical geometrical positions in each of the extension members 29, 30, receive a pin 35 which continues therethrough and is pivotally seated in the base structure 9, thus allowing the bottom handle 24 to be pivotally mounted to the base structure. The extension members 29, 30 continue past the bottom handle pivot point 35 and, integral with the extension members, provide attachment members 36, 37. The printing head 39 may be rigidly secured to the attachment members 36, 37 by corresponding structural members emanating rearwardly from the printing head, the members being maintained in a fixed relationship by fastener 38. Additionally, the attachment member 37 provides an arcuate rack 40 which also is integrally formed therewith, and the purpose of which will be subsequently explained.

The bottom handle 24 and upper handle 8 are positively related to one another through a spring 41 which is under constant tension. The spring 41 is substantially located within a recess 42 formed in the upper handle 8 and is secured to the rearmost end of the recess by a plate 43 having an aperture 44 therein, the plate itself being fixed to the upper handle by means of a flat head screw 45. The other end of the spring 41 is secured centrally of a cam pin 46 that is rigidly held between the extension members 29, 30, the extension members themselves being rigidly secured to the bottom handle 24. Thus, as is best seen in FIGURE 2, when the bottom handle 24 is squeezed toward the upper handle 8 from its initial position, the spring 41 is placed under even greater tension causing, upon release of the bottom handle, the bottom handle to return to the initial position shown in FIGURE 2. The bottom handle 24 is prevented from returning to a position farther away from the upper handle 8 than that shown because edges 47, 48 of the extension members 29, 30 abut against the base structure 9 as at 49, 50 to provide limit stops. It will be noted that the bottom handle 24 carries a limit screw 51 therein which is adjustable by means of nut 52, as to the extent it protrudes from the handle. The limit screw 51 cooperates with the flat head screw 45 to limit the distance through which the bottom handle 24 may be squeezed toward the upper handle 8. The aforementioned limited distance of travel is required to prevent the printing head 39 from contacting the labels 21 and the printing platen 171 with an excessive force, as will be subsequently more fully explained.

The print mechanism 1 includes a printing head 39, which itself forms no part of this invention other than being an integrated portion of the device as a whole, is of a type generally known in the art. As best seen in FIGURE 4, the printing head 39 includes a series of bands 53, each band carrying characters 54 such as, for example, letters, numbers, signs and designs. Each band is mounted such that it may be rotated for the purpose of selecting the desired character to be placed in printing position 55 on the printing head 39. The printing head 39 depicted herein has two series of bands 53 and, consequently, may print two lines of characters on each label 21. The characters 54 on the printing bands are rotated by means of wheel adjusters 56, one of which is provided for each series of bands 53. Associated with the printing head 39 is an ink pad 57 which is in constant contact with the characters 54 on the band that are in printing position 55 when the printing head is in the initial position, i.e., when the bottom handle 24 is at its farthest distance away from the top handle 8, as best seen in FIGURE 2. The ink pad 57 includes a pad permeated with ink and is seated in a pad holder 58 having a spring clip 59 attached thereto. Through cooperation of the pad holder 58 and the spring clip 59 the ink pad 57 is maintained in a fixed relationship with a swing seat 60. The spring clip 59 allows the pad holder 58 to be easily removed from the swing seat 60 such that the ink pad 57 may be periodically re-inked. The swing seat 60 has two arms 61, 62, one on each side of the seat, and each of which is rotatably affixed by means of a pin 63 and aperture 64 to the parallel structural side plates 65, 66 projecting from the base structure 9. The ink pad 57 is maintained in engagement with the characters 54 on the printing bands by means of tension springs 68, 68, one on each side of the printing head 39, and having one of their ends pinned, as at 69, 70, to one of the arms 61, 62 of the swing seat and the other of their ends pinned to the printing head, as at 71, 72.

When the bottom handle 24 is squeezed upwards towards the upper handle 8, the printing head 39 moves in the downward direction. As the head 39 moves downward, cam pins 73, 74 on each side of the printing head 39 contact cam surfaces 75, 76 on the arms 61, 62 of the swing seat 60, thereby pivotally swinging the swing seat, with the ink pad 57 and pad holder 58 clipped thereto, away from the descending printing head, as best shown in FIGURES 3 and 4. Of course, when the bottom handle 24 is released the printing head 39 moves upward and the springs 68, 68, which are under tension, return the swing seat 60 and ink pad 57 back into engagement with the characters 54 on the series of bands 53. Thus, the characters 54 are inked for each printing by the printing head 39, i.e., the characters are inked for each operational cycle.

Associated with the print mechanism 1 and the printing head 39 is a printing platen 171 for the purpose of providing the inked characters 54 with a solid opposing surface when the characters contact the label 21 such that well defined printed matter is transferred to the label. The printing platen 171 is best seen in FIGURES 2 and 9. The adjustment screws 45, 51, as previously described, are for the purpose of controlling the force which may be applied to the printing platen 171 from the characters 54 and, hence, help control the clarity of the printed matter. That is, the characters 54 on the printing head 39 and the printing platen 171 are substantially the same distance apart, when the handles 8, 24 are in the initial position, as are the heads of the screws 45, 51. Thus, the distance through which the printing head moves when the handles are squeezed together is closely controlled.

The drive mechanism 2 associated with the hand label dispensing device primarily includes drive means 3 and label strip movement limit means 4. The drive means 3 includes a drive or friction wheel 77 and an idler wheel 106 for the purpose of moving the label strip through the device. The drive wheel 77 is provided with an outer liner 79 of a material having a high coefficient of friction such as, for example, rubber, which contacts the backing strip 22 and maintains it in a non-slip engagement between the drive wheel and idler wheel 106. As best seen in FIGURE 5, the drive wheel 77 possesses a one-way spring clutch assembly 80 that permits the drive wheel to revolve only in a forward direction. The one-way clutch assembly 80 includes an inner bearing sleeve 81 frictionally engaged with a dowel member 82 which forms the axis of the drive wheel 77. Concentric with the inner bearing sleeve 81 are outer bearing sleeves 83, 84 each being approximately one-half the length of the inner bearing sleeve 81 and meeting at approximately the center thereof at a bearing surface 85. The outer bearing sleeve 83 is maintained in a fixed relationship with inner bearing sleeve 81 but outer bearing sleeve 84 is free to rotate relative to sleeves 83 and 81 through bearing surfaces 85 and 86. Rigidly attached to an outer flange 87 on the bearing sleeve 83 is a carrier sleeve 88 to which the frictional material 79 is attached. Thus, there is provided a chamber 89 between the carrier sleeve 88, the outer bearing sleeves 83, 84, and the flange 87 within which a coiled clutch spring 90 resides. The outer bearing sleeve 84 has a drive gear 91 rigidly secured thereto by means of pin 92 but, as previously mentioned, is free to rotate about dowel member 82.

The drive wheel 77, having the one-way spring clutch assembly 80 therein, and the drive gear 91 associated therewith are pivotally mounted to the side plates 65, 66 by means of drive wheel supporting structure 93 (in which the drive wheel is rotatably mounted by shaft 82) and dowel pin 94, the dowel pin being held to the side plates by fasteners 95. The pin 94 about which the drive wheel 77 pivots also carries an intermediate gear 96 which interrelates the drive gear 91 carried by the drive wheel and the arcuate rack 40 carried by the pivotable handle 24. Thus, as can be seen in FIGURE 2, when the arcuate rack 40 is forced in a downward direction by squeezing the bottom handle 24 toward the upper handle 8, the intermediate gear 96 is forced to rotate in a clockwise direction. The clockwise rotative direction of the intermediate gear 96, when translated to the drive gear 91, produces a counterclockwise motion in the drive gear. This counterclockwise motion in the drive gear 91 is received by the spring 90 in the one-way clutch assembly 80 associated with the drive wheel 77 such that the drive wheel does not rotate on the downward stroke of the arcuate rack 40.

Nonrotation of the drive wheel 77 on the downward stroke of the arcuate rack 40 is insured by means of a brake pin 97 associated therewith. The brake pin 97 is held in operational engagement with the drive wheel 77 by means of a leaf spring 98, which is secured to the drive wheel supporting structure 93 as at 99, cooperating with the supporting structure 93. As can be seen from FIGURES 6 and 7, the brake pin 97 has flanges 100 at each end thereof which keep the pin between the curved fingers 101 of the supporting structure 93 and the frictional liner 79 of the drive wheel 77. When the arcuate rack moves in a downward direction, as seen in FIGURES 2 and 6, the brake pin 97 binds or wedges in the space 102 between the liner surface 79 and the drive wheel supporting structure 93 because of the tendency of the slight counterclockwise drive wheel rotation to move the pin counterclockwise, too. Thus, counterclockwise rotation of the drive wheel is positively prevented and, as a result, prevents slack from forming in the label strip within the device.

When the arcuate rack 40 moves in an upward direction, the intermediate gear 96 revolves counterclockwise, when observed from the FIGURE 2 or 6 position, thus inducing a clockwise rotation of the drive gear 91. The drive gear 91 transmits the clockwise rotation through the one-way clutch 80, which is now activated, to the drive wheel 77, thus causing the drive wheel to have clockwise rotation. The brake pin 97, as a result of the clockwise rotation of the drive wheel 77, is consequently moved out of the binding space 102 and into the space 103 where it is free to rotate such that it no longer binds the drive wheel to prevent its rotation.

The drive wheel supporting structure 93 carries a level adjustment screw 104 which is adjustable in an elongated aperture 105, as seen in FIGURE 4, there being identical adjustments on each side of the structure 93. The adjustment screw 104 is for the purpose of leveling the cam surfaces 169 with the top surfaces of the limit arms 113, 114 when the clawlike ends 115, 116 are precisely positioned on top of the label strip so that a minute downward movement of ends 115, 116 will lift the drive wheel supporting structure 93, thereby instantly stopping the drive wheel from pulling the label strip. Adjustment of cam surfaces 169 must be precise to avoid triggering the stop action either too soon or too late. The adjustment screw 104 may be also used to maintain efficient contact and pressure between the frictional surface 79 and the idler wheel 106. The idler wheel 106 is maintained in a freely rotating relationship with the side members 65, 66 by means of the fasteners 111 and dowel member 112. Thus, an even and smooth pulling force on the backing strip 22 may be maintained during the operational life of the hand labeler.

Associated with the drive wheel 77 and supporting structure 93, and pivotally mounted to the side members 65, 66 by the same dowel pin 94 that pivotally mounts the drive wheel supporting structure 93, is the activator bracket 107. As can best be seen from FIGURES 3 and 4, at the top of the activator bracket 107 there is carried a cam channel 108 which is normally maintained in a rigid relationship with the activator bracket, but may be slidably adjusted with respect thereto, by means of a fastener 109. It will be noted that the cam channel 108 has cam surfaces 110 which cooperate with the cam pin 46 that is rigidly held between extension members 29, 30 when the bottom handle 24 is squeezed toward the upper handle 8 such that the activator bracket 107 is pivoted downwardly about pin 94.

The limit means 4 cooperate with the drive means 3 to provide many of the attributes of this invention and, as best depicted in FIGURES 4, 5 and 12, include limit arms 113, 114 having fingers or clawlike ends 115, 116. Each arm 113, 114 is pivotally secured to a side plate 65, 66 as at 117, 118. The pivotable limit arms 113, 114 are maintained in a fixed relationship one to the other by means of a front tie bar 119 and a rear tie bar 120, the rear tie bar having an aperture 121 therein. The arm 114 has an elongated aperture 122 therein for purposes of allowing the arcuate rack 40 to pass therethrough on its downward and upward strokes.

Associated with the pin member 35, about which the bottom handle 24 pivots, is a protuberance 123 having an aperture 124 therein, the protuberance also being in a rotatable relationship with the pin member 35. As can best be seen from FIGURE 2, an arm actuation tension spring 125 is secured between the aperture 121 in the rear tie member 120, which aperture is substantially intermediate the two pivotable arms 113, 114 and the aperture 124 in the protuberance 123. A drive wheel pivoting tension spring 126 is connected between the same aperture 124 in the protuberance 123 and an aperture 127 at the top of the drive wheel supporting structure 93. The protuberance 123 may itself be rotated with respect to the pin member 35 and a spring tension adjustment projection 128 having an adjustment screw 129 attached to its furthermost end is so that the tension of each spring may be adjusted.

Thus, to adjust the tension on the arm actuation spring 125 and the drive wheel pivoting tension spring 126 the adjustment screw 129 need merely be loosened and the tension adjustment projection 128 be moved along the elongated aperture 130 in the side structural member. Upon reaching the desired tension on the springs 125, 126 the adjustment screw 129 is merely tightened against the side plate 65, thus restraining the protuberance 123 from rotating about the pin 35. The greater the tension on the arm actuation spring 125 the lesser will be the tension on the drive wheel pivoting spring 126 and, thus, the greater will be the downward force exerted by the clawlike ends 115, 116 of the pivoted limit arms 113, 114, whether the clawlike ends are on top of the label strip or in the initial position, i.e., extending through notches 172 in the printing platen 171 and through the notches 131 in the label strip.

Figure 13:
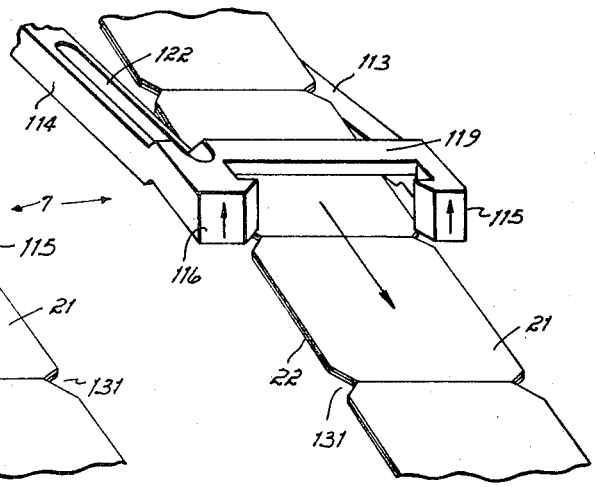
Figure 14:
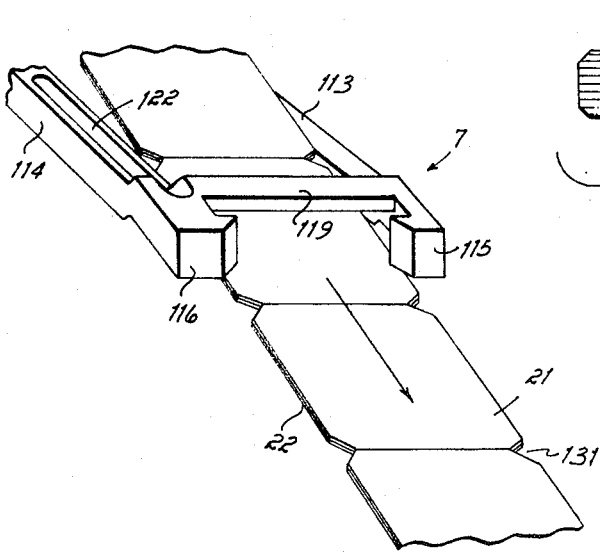

When the clawlike ends 115, 116 of the pivoted limit arms 113, 114 are resting in notches 131 of the label strip (hence, also in the notches 172 in the platen 171), as shown in FIGURE 12, the label strip cannot move through the device. Upon raising the clawlike ends 115, 116, as shown in FIGURE 13, the label strip becomes free to move through the device. FIGURE 14 depicts the label strip moving through the device with the clawlike ends resting on the top of the label strip. As the labels 21 move forward in the direction of the arrow the clawlike ends 115, 116 will subsequently contact another pair of notches 131 in the label strip and drop therethrough due to the force exerted on the clawlike ends by the arm actuation spring 125. The actuation and deactuation of the drive means is intimately associated with the operation and position of the limit arms 113, 114 and, along with the initial actuation of the limit arms 113, 114 themselves to initially raise the clawlike ends out of the notches 131, will be subsequently more fully described.

The dispenser-applicator mechanism 5 of the hand labeler includes label stripping means having an adjustable stripper bar 132 which is associated with the printing platen, and pressure means 6 including a pressure roller 133 which is rotatably mounted on arms 134, 135 extending from and integral with the printing platen 171. As best seen in FIGURES 8 and 9, the stripper bar 132 is rotatably mounted on an adjusting plate 136 which is slidably mounted on the printing platen 171 by means of an elongated aperture 137 in plate 136 and a fastener 138 by means of which the adjusting plate may be rigidly secured to the platen. Thus, the stripper bar 132 is adapted to be shifted relative to the pressure roller 133.

An outer layer 139 of the pressure roller 133 is generally made from a material having a high coefficient of friction such as, for example, rubber. The outer frictional layer 139 of the pressure roller 133 is mounted on a mount cylinder 140 which is rotatably mounted on a shaft 141, the shaft being fixed by fasteners 142 with respect to the arms 134, 135 extending from the printing platen 171. As best seen in FIGURES 5 and 9, the outer frictional layer 139 of the pressure roller 133 preferably has a pickled surface 143 such that the ink from the characters 54 on the printing bands 53, which has been placed on the labels 21 just prior to the labels contacting the pressure roller, will not be smeared thereon when the roller is rolled over the labels, as will be explained. The stripper bar 132 is generally adjustably positioned such that the label 21, at the end of the dispensing portion of the operational cycle, will have its leading edge in contact with the pressure roller 133 and its trailing edge still secured to the backing strip 22, as seen in FIGURE 4.

Cooperating with the bottom of the printing platen 171 and the stripping bar 132 are label strip locking means 7, the primary purpose of which is to prevent slack in the label strip as it passes the stripping bar 132. Primarily depicted in FIGURES 10 and 11, the locking mechanism 7 has a channel base 145 which is pivotally secured at the rear end 146 thereof to the side plates 65, 66 of the hand labeler device, as at 147, 148. Associated with the sides of the channel base 145 is a snubber bar 149 which, by means of pins 150, 151 integral with the bar 149 and slideways 152, 153 cut into the sides of the channel base at the forward end 154 thereof, maintains a sliding and pivoting relationship with the channel base. The snubber bar 149 has a slight hump 155 in the middle thereof for purposes of contacting the backing strip 22 and forcing it into engagement with the underside of the printing platen 171. To force the hump 155 on the snubber bar 149 into engagement with the underside of the printing platen 171 and to lock the locking means 7 into operational relationship with the side plates 65, 66 of the hand labeler, a channel latch plate 156 is provided. The latch plate 156 is positioned substantially underneath the channel base 145 and is slidably secured to the front end 154 thereof by means of a fastener 157 and elongated aperture 158. At the rear of the channel latch plate 156, and centrally located thereof, is a T-shaped fixture 159 which is integral with the latch plate and slidably cooperates with a slot in the rear end 146 of the channel base 145 to maintain a coaxial sliding relationship between the latch plate and channel base 145. The T-shaped fixture 159 has an aperture 160 at the top thereof and the snubber bar 149 has an aperture 161 therein located opposite the hump 155. A tension spring 162 is secured at each end thereof through the apertures 160, 161 and, when the locking means 7 is in operational position, as shown in FIGURE 11, the spring exerts a force on the snubber bar 149 which tends to keep the hump 155 in contact with the bottom of the printing platen 171, though providing give and resilience to the locking means. Therefore, if the backing strip 22 becomes restricted in its movement through the device, the hump 155 will be pivoted away from the printing platen about pins 150, 151 and tearing of the backing strip will be prevented. Conversely, when the pull on the backing strip 22 is released, the hump 155 will swing upward and clamp the backing strip 22 against the underside of platen 171.

The locking means 7 is locked into position with the side plates 65, 66, to which it is pivotally secured, by cooperation between a locking slot 163, 164 in each of the side plates and a locking protuberance 165, 166 on each side of and integral with the channel latch plate 156. To lock the label strip locking means 7 into operational position, the mechanism is pivoted into substantially operational position, the channel latch plate 156 is slid toward the pivot pins 147, 148 while continuing to press the mechanism upwardly, and the latch plate is then allowed to return to the position to which it is urged by the spring 162. Thus, the locking protuberances 165, 166 engage the locking slots 163, 164 and maintain the locking means 7 and snubber bar 149 in operational position.

As previously mentioned, when in operational position, as shown in FIGURE 11, the backing strip 22 passes between the snubber bar 149 and the bottom of the printing platen 171. The snubber bar 149 is free to pivot in the counterclockwise direction, to permit passage of the backing strip 22. Normally, however, the snubber bar 149 is being urged by the spring 162 in the clockwise direction and, hence, against the platen bottom. This normal effect of the spring 162 will prevent the backing strip 22 from becoming excessively slack when released by the drive wheel 77 and the idler wheel 106. The excessive slack tendency is due to the normal resistance of the backing strip 22 against the sharp bending action imposed as it passes around the stripping bar 132. Such slack is detrimental to the proper operation of the unit since it must be taken up by the drive mechanism 2 before any substantial movement of the label strip 21 is accomplished in the next cycle.

In operating the preferred embodiment of the hand labeling device of this invention, the first step is, of course, to thread the label-backing strip combination through the hand labeler and make it ready for the operational cycle. The locking means 7 is placed in the dotted line position shown in FIGURE 11 by sliding the channel lock plate 156 and, therefore, the locking protuberances 165, 166 out of engagement with the locking slots 163, 164 in the side plates 65, 66 and pivoting the mechanism downward. A length of the unprinted label-backing strip combination is then removed from the label supply roll 20 and threaded down a guide chute 167 and over the top of the printing platen 171, with a substantial length extending past the pressure roller 133, as best observed from FIGURE 2. The length of label strip extending past the pressure roller 133 is caused to abruptly reverse direction around the stripping bar 132 and is threaded between the idler wheel 106 and the drive wheel 77. The locking means 7 is subsequently raised and locked into operational position with the side structural members 65, 66 by steps equivalent to but opposite in order from its removal therefrom.

To initiate an operational cycle of the hand labeler, the bottom handle 24 is squeezed toward the upper handle 8. The movement of the bottom handle 24 toward the upper handle 8 causes the printing head 39 (with a pre-selected series of characters present on the bands) to move downward. The swing seat 60, having the ink pad 57 therewith, is concurrently caused to move away from the printing band characters 54 because of the cooperation between cam pins 73, 74 and cam surfaces 75, 76 on the swing seat arms 61, 62. Thus, the printing head 39 continues downward until it contacts the label, which is in a stationary position, on the printing platen 171. The maximum distance the printing head 39 may move is governed by the adjustment screw 51 and the flat head screw 45 in the handles 2, 8 of the device and these screws are normally so adjusted that efficient contact between the characters 54 on the printing bands 53 and label 21 residing on the printing platen 171 may be effected.

As the printing head 39 moves downward so does the arcuate rack 40 move downward. The arcuate rack 40 induces the one-way spring clutch assembly 80 to function such that the drive wheel 77, with the help of the brake pin 97, does not rotate and is, therefore, held stationary as to rotation during this downward movement phase of the operation cycle.

Additional movement takes place as the bottom handle 24 is squeezed toward the top handle 8 because of the cooperation between the cam pin 46 and the cam surface 110 of the cam channel structure 108. The sides of the activator bracket 107, which pivots about dowel pin 94 and which is rigidly secured to cam channel structure 108, carry cam surfaces 168 at the bottom ends thereof and the cam surfaces 168 are forced downwardly because of the aforementioned cooperation between the cam pin 46 and the surface 110. The cam surfaces 168 on their downward movement thereafter contact the top rear surfaces of the pivoted limit arms 113, 114 having the fingers or clawlike ends 115, 116. As a result, the clawlike ends 115, 116 of the pivoted limit arms 113, 114 are forced upwardly out of the notches 172 in the printing platen and out of the notches 131 in the label-backing strip combination. Along with the downward movement of the activator bracket 107, and through cooperation of the spring 126 which is under constant tension, and the rigidly held protuberance 123, the drive wheel 77, through its supporting structure 93 which pivotally connects it to the sides 65, 66 (also by means of dowel pin 94) is pulled and pivoted downward into intimate relationship with the idler wheel 106 and the backing strip 22 passing therebetween. Thus, the downward movement portion of the operational cycle is completed.

Upon the bottom handle 24 being released, the spring 41, which has been expanded as the handles 8, 24 were squeezed together, provides the energy required to return the bottom handle to its initial position as is shown in FIGURE 2.

As the bottom handle 24 commences to return to its initial position, it immediately carries the printing head 39 away from the label 21, which now has been printed, and, through the springs 68 cooperating with the swing seat (the springs also having been placed in greater tension during the downward portion of the cycle), the ink pad 57 is returned to engagement with the characters 54 on the printing bands 53.

Concomitant with the return of the printing head 39 to its initial position, the arcuate rack 40 moves upwardly, thus inducing a clockwise motion, when considering FIGURE 2, through the intermediate gear 96 to the drive gear 91 of the drive wheel 77. The clockwise motion of the drive wheel 77 releases the brake pin 97 from its braking position and the one-way clutch assembly 80 is actuated, thus causing the backing strip 22 to be moved rearward, i.e., toward the handles, between the drive wheel 77 and the idler wheel 106. Because of the upward movement of the arcuate rack 40 inducing a counterclockwise movement in the intermediate gear 96, which itself induces a clockwise movement in the drive wheel gear 77, and because of the geometrical positioning of the gears and arcuate rack relative to the pivot pin 94, it will be seen that, should the drive wheel 77 encounter resistance in pulling the backing strip 22 around the stripping bar 132, the greater the resistance encountered the greater will be the tendency of the drive wheel 77 to contact the backing strip 22 and the idler wheel 106. This use of mechanical leverage makes it possible to employ a relatively small tension spring 126 to pull the drive roll 77 and drive roll support structure 93 into contact with the backing strip 22 and idler roll 106. Of course, the relatively small tension spring 126 required to pivot the drive wheel 77 into position also permits the use of a relatively small tension spring 125, which ultimately must overcome the pull of spring 126, to lift the drive roll 77 from contact with the backing strip 22 and idler wheel 106 when the clawlike ends 115, 116 of the limit arms 113, 114 drop into the notches in the label strip. Thus, the mechanical leverages present in the drive mechanism gear system are so deployed that contact pressure of the drive roll surface with the backing strip is increased as the resistance to movement of the backing strip is increased, thereby preventing slippage and insuring a constant pull rate.

At the same time that the backing strip 22 is being moved rearward, the label 21 is being stripped therefrom at the stripping bar 132 because of the abrupt change in direction of the backing strip. The label 21 moves a distance such that the leading edge of the label is brought into contact with the pressure roller 133 with the trailing edge remaining adhered to the backing strip. Depending on the length of the labels, the leading edge-trailing edge relationship may be maintained by the adjustment plate 136 to which the stripping bar 132 is rotatably secured. If the label 21 is of such length that it tends to fall off the backing strip before it can be applied to the goods, the stripping bar 132 is moved forwardly. If the label 21 tends to cling too tightly to the backing strip 22 while it is being applied to the article, the stripping bar 132 is moved rearwardly or away from the pressure roller 133.

Constant tension as well as prevention of slack in the backing strip 22 is insured at the stripping bar 132 through the label strip locking means 7, as was previously mentioned in describing the locking means.

Figure 15:
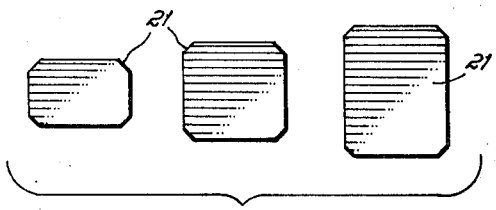
FIGURE 15 illustrates labels of different representative lengths which may be used with the hand labeler of this invention.

As the label-backing strip combination is pulled forward under force supplied by the drive wheel 77 and idler wheel 106 when the bottom handle 24 commences to return to its initial position, the clawlike ends 115, 116 of the pivoted limit arms 113, 114 descend, as shown in FIGURE 3, and ride on the top of the label strip as it is being pulled through the device, as seen in FIGURE 15. The clawlike ends 115, 116 eventually contact a notch 131 in the label strip and, because of the accentuated tendency of the clawlike ends to move downwardly through the notches in the label strip as well as the notches 172 in the printing platen 171, due to the arm actuation spring 125, they do so move when they contact notch 131. Thus, the rear ends of the pivoted limit arms 113, 114 are forced upwardly. The upward movement causes the rear arm surfaces to instantly contact cam surfaces 169, 168 at the lower ends of the sides of the drive wheel supporting structure 93 and the activator bracket 107, causing both the supporting structure and the activator bracket to pivot upwardly about the dowel pin 94. Therefore, driving engagement of the drive wheel 77 with the backing strip 22 and idler wheel 106 is effectively broken as soon as the clawlike ends 115, 116 drop through the notches 131 in the label strip because the drive wheel support structure 93 is so pivoted that the drive wheel loses operational contact with the idler wheel. Tearing of the label strip is not possible because as soon as the clawlike ends 115, 116 drop through the notches 131, the label strip is no longer being pulled through the device.

The label 21 will be in the position as shown in FIGURE 2 when the bottom handle 24 returned to its initial position. To complete the operational cycle the label 21 must be applied to the merchandise. The leading edge of the label 21 is engaged with the goods to which it is to be attached and the pressure roller 133 rolled rearwardly over it to securely attach the label. It is also by means of the rearward rolling of the pressure roller 133 that the trailing edge of the label is separated from the backing strip 22. Thus, the label 21 is essentially "rolled on" the merchandise.

It is now obvious that substantially any length label (within reasonable limits) may be employed in the hand labeler, the length being dependent only upon the maximum length of the arc through which the bottom handle 24 travels and the gear ratio employed to transfer this movement to the drive wheel 77. It is also obvious that substantially no adjustments are necessary to the device such as it may handle substantially any given range of label lengths. Additionally, it is obvious that through the geometrical relationship of the limit means 4 and the print mechanism 1 the labels 21 are positively positioned at all times under the printing head 39 to insure correct centering of the printed matter on each label.

It will be understood that various changes and modifications in the details, materials and arrangements of components, which have been herein disclosed for purposes of illustration, may be made in accordance with the principles of this invention by those skilled in the art without departing from the spirit and scope of the invention as expressed in the appended claims.

What I desire to claim and protect by Letters Patent is:

1. A hand operable labeling device for accomplishing a plurality of operational cycles whereby labels are adhered to merchandise, each cycle including the steps of printing, dispensing and applying a label from a continuous label strip which has been unwound from a label supply roll, comprising holder means secured to said device for maintaining said label supply roll in a fixed position whereby said label supply roll may be rotated to unwind said label strip therefrom, a first handle whereby said device may be gripped, a second handle pivotally secured to said first handle, a base frame secured to said first handle and extending beyond the pivotal intersection of said handles, a pivoting frame secured to said second handle and extending beyond the pivotal intersection of said handles, limit means for permitting the non-pivoted ends of said handles to move a maximum distance away from one another to an initial position, said handles at the initial position forming an acute angle therebetween, a printing mechanism for printing said labels, said printing mechanism having components secured to said pivoting frame, and components secured to said base frame, a drive mechanism for moving said label strip through said device, said drive mechanism being secured to said base frame, and a dispenser-applicator mechanism for separating said labels from said label strip and applying said labels as desired, said dispenser-applicator mechanism being secured to said base frame.

2. A device as set forth in claim 1 wherein said print mechanism comprises a printing head for printing said labels, said printing head being secured to said pivoting frame, and a printing platen for providing a solid base over which said flexible label strip moves, said platen being secured to said base frame such that said printing head may be pivoted into operational relationship therewith to effect printing of said labels.

3. A device as set forth in claim 1 wherein said drive mechanism comprises drive means for moving said label strip through said device, and limit means for ensuring the distance of movement of said label strip through said device during each of said operational cycles is substantially equivalent to the length of one of said labels being dispensed therefrom.

4. A device as set forth in claim 1 wherein said dispenser-appliactor mechanism comprises label strip locking means for ensuring that said label strip effectively proceeds in only one direction through said device thereby preventing excessive slack in the opposite direction, label separator means for substantially separating said labels fom said label strip after the printing thereof, and pressure applicator means for promoting adherence of said label to said merchandise.

5. A hand operable labeling device for accomplishing a plurality of operational cycles whereby labels are adhered to merchandise, each cycle including the steps of printing, dispensing and applying a label from a continuous label strip which has been unwound from a label supply roll, said labels being separated one from the other on a backing strip and having at least one opening in said label strip at each label separation, comprising holder means secured to said device for maintaining said label roll in a fixed position whereby said label roll may be rotated to unwind said label strip therefrom, a first handle whereby said device may be gripped, a second handle pivotally secured to said first handle, a base frame secured to said first handle and extending beyond the pivotal intersection of said handles, a pivoting frame secured to said second handle and extending beyond the pivotal intersection of said handles, limit means for permitting the non-pivoted ends of said handles to move a maximum distance away from one another to an initial position, said handles at the initial position forming an acute angle therebetween, a printing head for printing said labels, said printing head being secured to said pivoting frame, a printing platen for providing a solid base over which said flexible label strip moves, said platen being secured to said base frame such that said printing head may be pivoted into operational relationship therewith to effect printing of said labels, drive means for moving said label strip through said device, at least one limit arm interrelated with said drive means and pivotally secured to said device, a forward end of said limit arm having at least one finger thereon which cooperates with said opening in said label strip when said second handle is in said initial position, thereby preventing said label strip from movement through said device, and deactivation means interrelated with said limit arm and constantly urging said forward end such that, when said label strip is moving through said device, said forward end rides on said label strip until such time that said finger contacts said opening and drops therethrough causing said drive means to be deactivated.

6. A device as set forth in claim 5 including
actuation means associated with said limit arm and said handles such that said finger is removed from said opening in said label strip as said handles are pivoted toward one another.

7. A device as set forth in claim 6 including
label strip locking means for ensuring that said label strip effectively proceeds in only one direction through said device thereby preventing excessive slack in the opposite direction, and
label separator means for substantially separating said labels from said label strip after the printing thereof.

8. A device as set forth in claim 7 including
pressure applicator means for promoting adherence of said label to said merchandise.

9. A device as set forth in in claim 6 wherein said drive means comprise
a rotatable drive wheel secured to said base frame,
rotating means for causing said drive wheel to rotate, said rotating means being cooperatively interrelated with said limit arm and said second handle, and
a freely rotatable idler wheel secured to said base frame, said label strip passing between said drive wheel and said idler wheel.

10. A device as set forth in claim 6 wherein said drive means comprise
a rotatable drive wheel,
a one-way clutch assembly associated with said drive wheel such that said drive wheel rotates only in one forward direction,
a drive gear secured to said one-way clutch assembly,
a drive wheel support bracket wherein said drive wheel is rotatably mounted, said support bracket being pivotably mounted to said base frame,
a rotatable idler wheel secured in a fixed relationship with said base structure such that said drive wheel may be pivoted into operational contact therewith,
at least one camming end on said drive wheel support bracket which cooperates with the rear surface on said limit arm to move said drive wheel out of operational contact with said idler wheel and said label strip as said finger on said forward end contacts said opening in said label strip and drops therethrough, and
a rack having teeth thereon, said rack being integral with said pivoting frame and positioned such that said teeth operationally mesh with said drive gear upon the pivotal movement of said second handle toward said first handle whereby said one-way clutch prevents said drive wheel from rotating as said handles are moved together and allows said drive wheel to rotate forward as said handles return to said initial position.

11. A device as set forth in claim 10 wherein said actuation means comprise
an actuator bracket pivotally mounted to said base frame and interrelated with said second handle such that said actuator bracket is pivoted upon said handles being pivoted toward one another, and
at least one camming end on said actuator bracket which cooperates with the rear surface on said limit arm to raise said finger out of said opening in said label strip upon said handles being pivoted toward one another.

12. A device as set forth in claim 6 wherein said drive means comprise
a rotatable drive wheel,
a one-way clutch assembly associated with said drive wheel such that said drive wheel rotates only in a forward direction,
a drive gear secured to said one-way clutch assembly,
a drive wheel support bracket wherein said drive wheel is rotatably mounted, said support bracket being pivotally mounted to said base frame,
a rotatable idler wheel secured in a fixed relationship with said base structure such that said drive wheel may be pivoted into operational contact therewith,
at least one camming end on said drive wheel support bracket which cooperates with the rear surface on said limit arm to raise said drive wheel out of operational contact with said idler wheel and label strip as said finger on said forward end contacts said opening in said label strip and drops therethrough,
a rotatable intermediate gear secured in a fixed relationship to said base structure at the pivot axis of said drive wheel support bracket, said intermediate gear upon the pivotal movement of said second with said drive gear,
a rack having teeth thereon, said rack being integral with said pivoting frame and positioned such that said teeth operationally mesh with said intermediate gear upon the vertical movement of said second handle toward said first handle whereby said one-way clutch prevents said drive wheel from rotating as said handles are moved together and allows said drive wheel to rotate forward as said handles return to said initial position, and
a brake pin associated with said drive wheel and said support bracket for positively preventing rearward rotation of said drive wheel, said brake pin tending to bind between said support structure and said drive wheel during rearward rotation of said drive wheel and tending to move freely out of binding contact with said drive wheel and said support structure during forward rotation of said drive wheel.

13. A device as set forth in claim 12 wherein said actuation means comprise
an actuator bracket pivotally mounted to said base frame and interrelated with said second handle such that said actuator bracket is pivoted downwardly upon said handles being pivoted toward one another, and
at least one camming end on said actuator bracket which cooperates with the rear surface on said limit arm to raise said finger out of said opening in said label strip upon said handles being pivoted toward one another.

14. A hand operable labeling device for accomplishing a plurality of operational cycles whereby labels are adhered to merchandise, each cycle including the steps of printing, dispensing and applying a label from a continuous label strip which has been unwound from a label supply roll, said labels being separated one from the other on a backing strip and having at least one opening in said label strip at each label separation, comprising holder means secured to said device for maintaining said label roll in a fixed position whereby said label roll may be rotated to unwind said label strip therefrom, a first handle whereby said device may be gripped, a second handle pivotally secured to said first handle, a base frame secured to said first handle and extending beyond the pivotal intersection of said handles, a pivoting frame secured to said second handle and extending beyond the pivotal intersection of said handles, limit means for permitting the non-pivoted ends of said handles to move a maximum distance away from one another to an initial position, said handles at the initial position forming an acute angle therebetween, a printing head for printing said labels, said printing head being secured to said pivoting frame, a printing platen for providing a solid base over which said flexible label strip moves, said platen being secured to said base frame such that said printing head may be pivoted into operational relationship therewith to effect printing of said labels, a rotatable drive wheel, a one-way clutch assembly associated with said drive wheel such that said drive wheel rotates only in one direction, a drive gear secured to said one-way clutch assembly, a drive wheel support bracket wherein said drive wheel is rotatably mounted, said support bracket being pivotally mounted to said base frame, a rotatable idler wheel secured in a fixed relationship with said base structure such that said drive wheel may be pivoted into operational contact therewith, a rack having teeth thereon, said rack being integral with said pivoting frame and positioned such that said teeth operationally mesh with said drive gear upon the pivotal movement of said second handle toward said first handle whereby said one-way clutch prevents said drive wheel from rotating as said handles are moved together and allows said drive wheel to rotate as said handles return to said initial position, at least one limit arm interrelated with said drive wheel and pivotally secured to said device, a forward end of said limit arm having at least one finger thereon which cooperates with said opening in said label strip when said second handle is in said initial position thereby preventing said label strip from movement through said device, an actuator bracket pivotally mounted to said base frame and interrelated with said second handle such that said actuator bracket is pivoted upon said handles being pivoted toward one another, at least one camming end on said actuator bracket which cooperates with the rear surface on said limit arm to raise said finger out of said opening in said label strip upon said handles being pivoted toward one another, deactivation means interrelated with said limit arm and constantly urging said forward end such that, when said label strip is moving through said device, said forward end rides on said label strip until such time that said finger contacts said opening and drops therethrough causing said drive wheel to be deactivated, at least one camming end on said drive wheel support bracket which cooperates with the rear surface on said limit arm to move said drive wheel out of operational contact with said idler wheel and said label strip as said finger on said forward end contacts said opening in said label strip and drops therethrough, label strip locking means for ensuring that said label strip effectively proceeds in only one direction through said device thereby preventing excessive slack in the opposite direction, and label separator means for substantially separating said label from said label strip after the printing thereof.

15. A device as set forth in claim 14 wherein said label strip locking means comprises a channel base located beneath said printing platen, said printing head being above said platen, means at the rear end of said channel base whereby said locking means is pivotally secured to said base frame, a snubber par pivotally associated with the front end of said channel base, said snubber bar being located such that effective contact of said label strip passing between said snubber bar and the bottom of said printing platen, when said snubber bar is in operation, is provided, resilient means for maintaining said snubber bar in operational contact with said platen yet allowing said bar to give if movement of said label strip becomes restricted, a latch plate slideably secured to said channel base, latch means integrally associated with said latch plate, latch slots within said base frame whereby said locking means may be maintained in operational position with said base frame through cooperation of said latch slots with said latch means.

16. A device as set forth in claim 15 wherein said label separater means comprises a rotatable stripping bar secured to said base frame in a fixed dimensional relationship with said finger on said limit arm whereby said labels are separated from said label strip to an extent such that at the completion of one of said operational cycles one of said labels is projecting forward of said stripping bar while only the trailing edge of said label remains adhered to said label strip, said label strip passing around said stripping bar while under a relatively substantial tension such that said labels are separated from said label strip.

17. A device as set forth in claim 16 including pressure applicator means for promoting adherence of said label to said merchandise, said pressure applicator means being secured to said base frame.

18. A device as set forth in claim 17 wherein said pressure applicator means comprises a rotatable pressure roller secured to said base frame, and an outer liner of frictional material for said pressure roller, said liner having a pickled surface.

19. A device as set forth in claim 18 wherein said stripping bar axis is substantially parallel to said pressure roller axis, said stripping bar axis also being adjustable with respect to said pressure roller axis in regards to distance therefrom.

20. Apparatus for limiting the distance of travel of a label strip having openings therein through a labeling device during on operational cycle thereof comprising support structure for mounting said apparatus, drive means for moving said label strip through said device, said drive means being secured to said structure, at least one limit arm having a forward end shaped such that said end fits within said openings, said arm being pivotally mounted to said structure such that the forward end may freely move in and out of said openings and being positioned during the moving of said label strip through said device such that the forward end of said arm rides on top of said label strip, and transmittal means interrelating the pivotal movement of said limit arm with said drive means such that when the forward end of said limit arm drops through said openings in said label strip, as said label strip moves forward under said forward end, said label strip ceases to move forward.

21. Apparatus as set forth in claim 20 wherein said drive means comprise
   a drive wheel support bracket, said support bracket being pivotably mounted to said support structure,
   a drive wheel, said drive wheel being rotatably mounted within said drive wheel support bracket, and
   a rotatable idler wheel secured in a fixed relationship with said base structure such that said drive wheel may be pivoted into operational contact therewith said said label strip passing between said drive wheel and said idler wheel.

22. Apparatus as set forth in claim 21 wherein said transmittal means comprises
   deactivation means urging said forward end of said limit arm downwardly at all times such that said end rides on said label strip as it moves through said device until such time whereat said forward end contacts said openings and drops therethrough causing the rear end to rise, and
   at least one bottom cam surface on said drive wheel support bracket such that when said rear end of said limit arm rises said rear end contacts said base cam surface and forces said drive wheel out of operational contact with said label strip.

23. A drive mechanism for a labeling device which prevents slippage of the label strip while said drive mechanism is acting thereon comprising
   a base frame for mounting said drive mechanism,
   a drive wheel support structure pivotally secured to said base frame,
   a drive wheel rotatably mounted to said drive wheel support structure,
   a rotatable idler wheel secured to said base frame in a fixed relationship such that said rotatable drive wheel may be pivoted into operational contact therewith,
   a drive gear secured to said drive wheel,
   a rotatable intermediate gear secured to said supporting structure and meshing with said drive gear, said intermediate gear being mounted to the same side of a plane passing through the axes of said drive and idler wheels as the point about which said drive wheel support structure pivots, and
   an actuating rack having gear teeth thereon for rotating said intermediate gear, said actuating rack having an operational direction whereby said drive wheel is rotated that produces a movement about the pivot point of said drive wheel supporting structure which forces said drive wheel and said idler wheel into intimate contact.

References Cited

UNITED STATES PATENTS

| | | | |
|---|---|---|---|
| 2,656,063 | 10/1953 | Kafka | 156—384 |
| 2,687,819 | 8/1954 | Hill et al. | 156—384 |
| 3,124,498 | 3/1964 | Ziegler | 156—384 |
| 3,265,553 | 8/1966 | Kind et al. | 156—384 |
| 3,266,693 | 8/1966 | Hughes | 226—129 |
| 3,342,662 | 9/1967 | Grasmann | 156—384 |
| 3,343,485 | 9/1967 | Loeffler | 156—384 X |

HAROLD ANSHER, *Primary Examiner.*

U.S. Cl. X.R.

156—543, 556, 579, 584; 226—129, 133, 156

UNITED STATES PATENT OFFICE
CERTIFICATE OF CORRECTION

Patent No. 3,440,123                                              April 22, 1969

Paul H. Hamisch, Sr.

It is hereby certified that error appears in the above numbered patent requiring correction and that the said Letters Patent should read as corrected below.

Column 14, Line 46, delete "appliactor" and insert -- applicator --; Line 52, delete "fom" and insert -- from --. Column 16, Line 38, delete "upon the pivotal movement of said second" and insert -- in the same plane as and operationally meshing --; Line 43, delete "vertical" and insert -- pivotal --. Column 18, Line 14, delete "par" and insert -- bar --; Line 60, delete "on" and insert -- an --.

Signed and sealed this 2nd day of September 1969.

(SEAL)
Attest:

EDWARD M. FLETCHER, JR.
Attesting Officer

WILLIAM E. SCHUYLER, JR.
Commissioner of Patents

Disclaimer 3,440,123.—*Paul H. Hamisch, Sr.*, Dayton Ohio. HAND LABELER. Patent dated Apr. 22, 1969. Disclaimer filed June 3, 1971, by the assignee, *The Monarch Marking System Company.*

Hereby enters this disclaimer to claims 1 through 23 of said patent.

[*Official Gazette August 31, 1971.*]